United States Patent [19]
Amini et al.

[11] Patent Number: 5,966,728
[45] Date of Patent: Oct. 12, 1999

[54] COMPUTER SYSTEM AND METHOD FOR SNOOPING DATE WRITES TO CACHEABLE MEMORY LOCATIONS IN AN EXPANSION MEMORY DEVICE

[75] Inventors: Nader Amini; Bechara Fouad Boury, both of Raleigh, N.C.; Sherwood Brannon, Fremont, Calif.; Richard Louis Horne, Boynton Beach, Fla.

[73] Assignee: International Business Machines Corp., Armonk, N.Y.

[21] Appl. No.: 08/490,648

[22] Filed: Jun. 15, 1995

Related U.S. Application Data

[63] Continuation-in-part of application No. 08/327,136, Oct. 21, 1994, Pat. No. 5,673,414, which is a continuation of application No. 07/816,204, Jan. 2, 1992, abandoned.

[51] Int. Cl.$^6$ ................................................ G06F 13/00
[52] U.S. Cl. .................................... 711/146; 711/2
[58] Field of Search ........................... 395/473, 468, 395/494, 495, 483, 471, 840, 842, 845, 848, 287, 290, 306, 308, 445; 711/118, 141, 146, 144, 156, 167, 168, 2

[56] References Cited

U.S. PATENT DOCUMENTS

| | | | |
|---|---|---|---|
| 5,072,369 | 12/1991 | Theus et al. | 711/146 |
| 5,119,485 | 6/1992 | Ledbetter, Jr. et al. | 711/146 |
| 5,193,170 | 3/1993 | Lam | 711/146 |
| 5,226,144 | 7/1993 | Moriwaki et al. | 711/121 |
| 5,317,720 | 5/1994 | Stamm et al. | 711/143 |
| 5,325,504 | 6/1994 | Tipley et al. | 711/128 |
| 5,341,487 | 8/1994 | Derwin et al. | 711/146 |

*Primary Examiner*—Glenn Gossage
*Attorney, Agent, or Firm*—William N. Hogg

[57] ABSTRACT

A computer system and method allow memory locations in both system memory and expansion memory devices coupled to an input/output (I/O) bus to be cacheable in a central processing unit (CPU) cache. The computer system contains an I/O bus connected to I/O devices and an expansion bus connected to expansion memory devices, a system memory not accessible via the I/O bus or expansion bus, and the system bus used for conducting data transfers between the I/O bus and both the CPU cache and system memory. The I/O bus supports data transfers between pairs of I/O devices, and I/O devices and expansion memory devices on the expansion bus, as well as data transfers between individual I/O devices and the system, which presents a problem of maintaining coherency in the CPU cache when data is written by one I/O device or expansion memory device to a cacheable memory location in another I/O device or expansion memory device. The computer system employs a snoop/data invalidation function at the system interface to the I/O bus to determine when a memory location in an expansion memory device coupled to the expansion bus is being written to by another expansion memory device coupled to the expansion bus or an I/O device coupled to the I/O bus. If such a write is taking place, it is then determined if the address of the location being written is in and address range predesignated as cacheable; if so, then the CPU cache controller or other device controlling the CPU cache is notified that memory at a cacheable location in an expansion memory device has been overwritten.

15 Claims, 9 Drawing Sheets

COMPUTER SYSTEM AND METHOD FOR SNOOPING DATE WRITES TO CACHEABLE MEMORY LOCATIONS IN AN EXPANSION MEMORY DEVICE

This is a continuation-in-part of U.S. patent application Ser. No. 08/327,136, filed Oct. 12, 1994, now U.S. Pat. No. 5,673,414, which is a continuation of application Ser. No. 07/816,204, filed Jan. 2, 1992, now abandoned.

CROSS-REFERENCE TO RELATED APPLICATIONS

The following United States patent applications are incorporated herein by reference as if they had been fully set out:

application Ser. No. 07/816,116 filed Jan. 2, 1992, titled "ARBITRATION CONTROL LOGIC FOR COMPUTER SYSTEM HAVING DUAL BUS ARCHITECTURE," now U.S. Pat. No. 5,265,211.

application Ser. No. 07/816,184 filed Jan. 2, 1992, titled "PARITY ERROR DETECTION AND RECOVERY," now U.S. Pat. No. 5,313,627.

application Ser. No. 07/816,203 filed Jan. 2, 1992, titled "BUS INTERFACE LOGIC FOR COMPUTER SYSTEM HAVING DUAL BUS ARCHITECTURE," now U.S. Pat. No. 5,255,374.

application Ser. No. 07/816,691 filed Jan. 2, 1992, titled "BIDIRECTIONAL STORAGE FACILITY FOR BUS INTERFACE UNIT," now abandoned, continued as Ser. No. 08/282,159 filed Jul. 28, 1994, now U.S. Pat. No. 5,644,729 titled "BIDIRECTIONAL DATA BUFFER FOR A BUS-TO-BUS INTERFACE UNIT IN A COMPUTER SYSTEM."

application Ser. No. 07/816,693 filed Jan. 2, 1992, titled "BUS INTERFACE LOGIC FOR CONTROLLING SPEED OF BUS OPERATION", now abandoned.

application Ser. No. 07/816,698 filed Jan. 2, 1992, titled "METHOD AND APPARATUS FOR DETERMINING ADDRESS LOCATION AT BUS TO BUS INTERFACE, " now abandoned.

application Ser. No. 07/816,992 filed Jan. 2, 1992, titled "BUS CONTROL LOGIC FOR COMPUTER SYSTEM HAVING DUAL ARCHITECTURE," now U.S. Pat. No. 5,544,346.

FIELD OF THE INVENTION

The present invention relates generally to a method and apparatus to allow cachable memory locations to exist in devices coupled to I/O buses which are written to by other devices coupled to the I/O bus when the I/O bus memory locations are cachable by a CPU coupled to a system bus.

BACKGROUND OF THE INVENTION

Generally in computer systems and especially in personal computer systems, data is transferred between various system devices such as a central processing unit (CPU), memory devices, and direct memory access (DMA) controllers. In addition, data is transferred between expansion elements such as input/output (I/O) devices, and between these I/O devices and the various system devices. The I/O devices and the system devices communicate with and amongst each other over computer buses, which comprise a series of conductors along which information is transmitted from any of several sources to any of several destinations. Many of the system devices and the I/O devices are capable of serving as bus controllers (i.e., devices which can control the computer system) and bus slaves (i.e., elements which are controlled by bus controllers).

Personal computer systems having more than one bus are known. Typically, a local bus is provided over which the CPU communicates with cache memory or a memory controller, and a system I/O bus is provided over which system bus devices such as the DMA controller, or the I/O devices, communicate with the system memory via the memory controller. The system I/O bus comprises a system bus and an I/O bus connected by a bus interface unit. The I/O devices communicate with one another over the I/O bus. The I/O devices are also typically required to communicate with system bus devices such as system memory. Such communications must travel over both the I/O bus and the system bus through the bus interface unit.

Typically, one function that a CPU complex contains is that of a cache storage, that stores frequently used data which it reads from various locations in system memory. These cached data are readily available to the CPU without the necessity of frequently going into system memory to fetch the required data, which can be time consuming. Of course, in the case of system memory that can be rewritten with updated or changed data, it is necessary that the CPU complex be "informed" of this rewriting so that any cached data in the CPU complex which corresponds to data which has been rewritten in the memory, and is thus "corrupted, " can be discarded and the new or rewritten data cached, or at least the corrupted data be identified.

This is accomplished by the provision of a snoop/data invalidation function. This function is performed by monitoring the data address and command instructions on the system bus. If at any time this monitoring function detects a write operation to a memory location in system memory which is a location from which the data therein can be cached in the CPU complex, a signal is sent to the CPU complex indicating the address of new data being written into the system memory. This is often referred to as a "positive snoop invalidation". When receiving the signal, the CPU complex can take appropriate action such as discarding the corrupted data and caching the rewritten data.

This technique works well when the write operations to cachable memory are performed on the system bus. However, if the write operation to a memory location is not on the system bus, i.e. it is to a device coupled to the I/O bus, then the snooping function on the system bus can not detect rewritten data to the memory locations; and thus, if data from those locations has been previously cached in the CPU complex, the CPU complex would not "know" that the cached data were corrupted. Such is the case when the memory locations are on devices coupled to the I/O bus, and the rewriting is being performed from a device coupled to the I/O bus and thus never gets put on the system bus. In the absence of a snooping/data invalidate function detecting any rewriting of data into memory, no memory locations coupled to the I/O bus can be cached by the CPU complex, since the CPU complex would never "know" when new data has been written to I/O memory.

Accordingly, it is an object of this invention to provide a technique for providing and indicating cachable memory locations in devices coupled to the I/O bus, allowing memory to be cached in the CPU complex from these identified cachable locations and notifying the CPU complex when data has been written into any cachable memory location from devices coupled to the I/O bus.

SUMMARY OF THE INVENTION

According to the present invention, a computer system is provided having a CPU complex including a cache function, a system bus coupled to the CPU complex, system memory coupled to the CPU complex through the system bus, an I/O bus, and at least one memory device coupled to the I/O bus. A bus control unit is coupled between the system bus and the I/O bus. Means are provided to identify memory locations in devices coupled to the I/O bus which are cachable memory locations. The bus control unit includes means to monitor transmissions on the I/O bus and determine when a write function is being performed by a device coupled to the I/O bus and the write function is being performed to a cachable memory address in a device coupled to the I/O bus. Means are provided to write onto the system bus the address of a write to a cachable memory address made by a device coupled to the I/O bus to a device coupled to the I/O bus.

DETAILED DESCRIPTION OF THE PREFERRED EMBODIMENT

Figure 1:
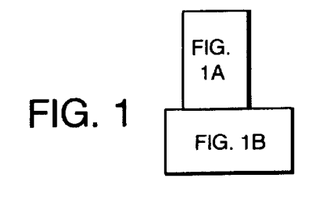
FIG. 1 is a schematic block diagram of a computer system incorporating a bus interface unit constructed according to the principles of the present invention.
Figure 1A:
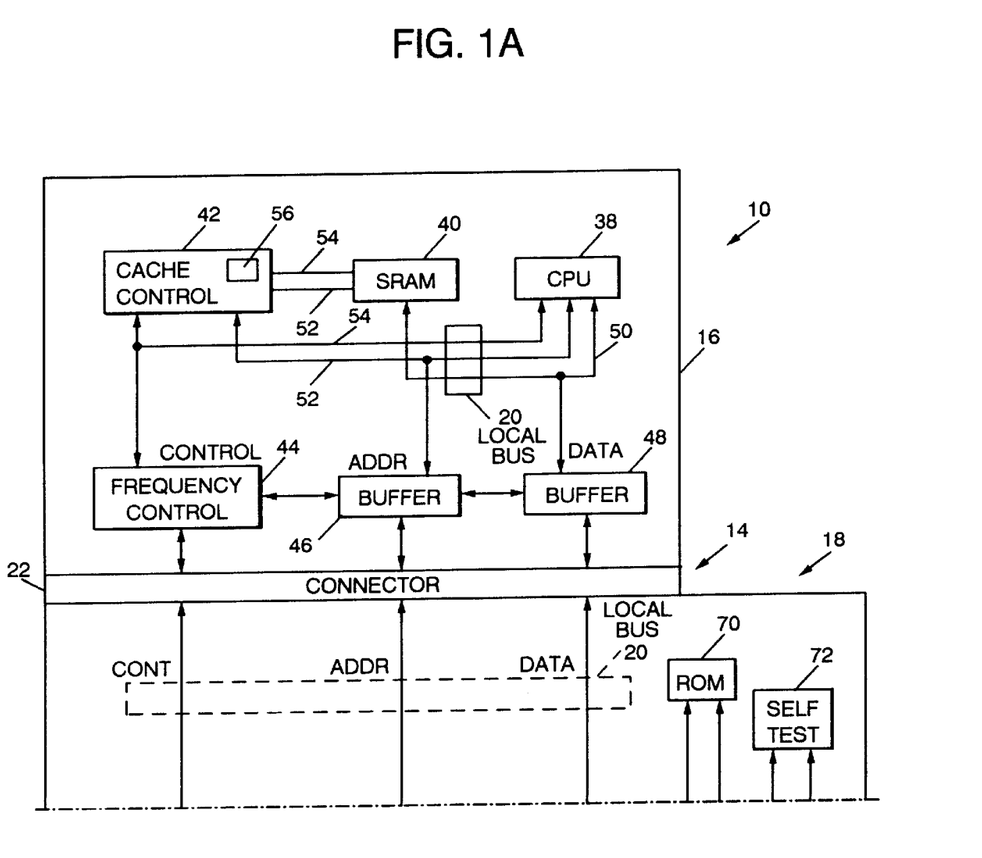
Figure 1B:
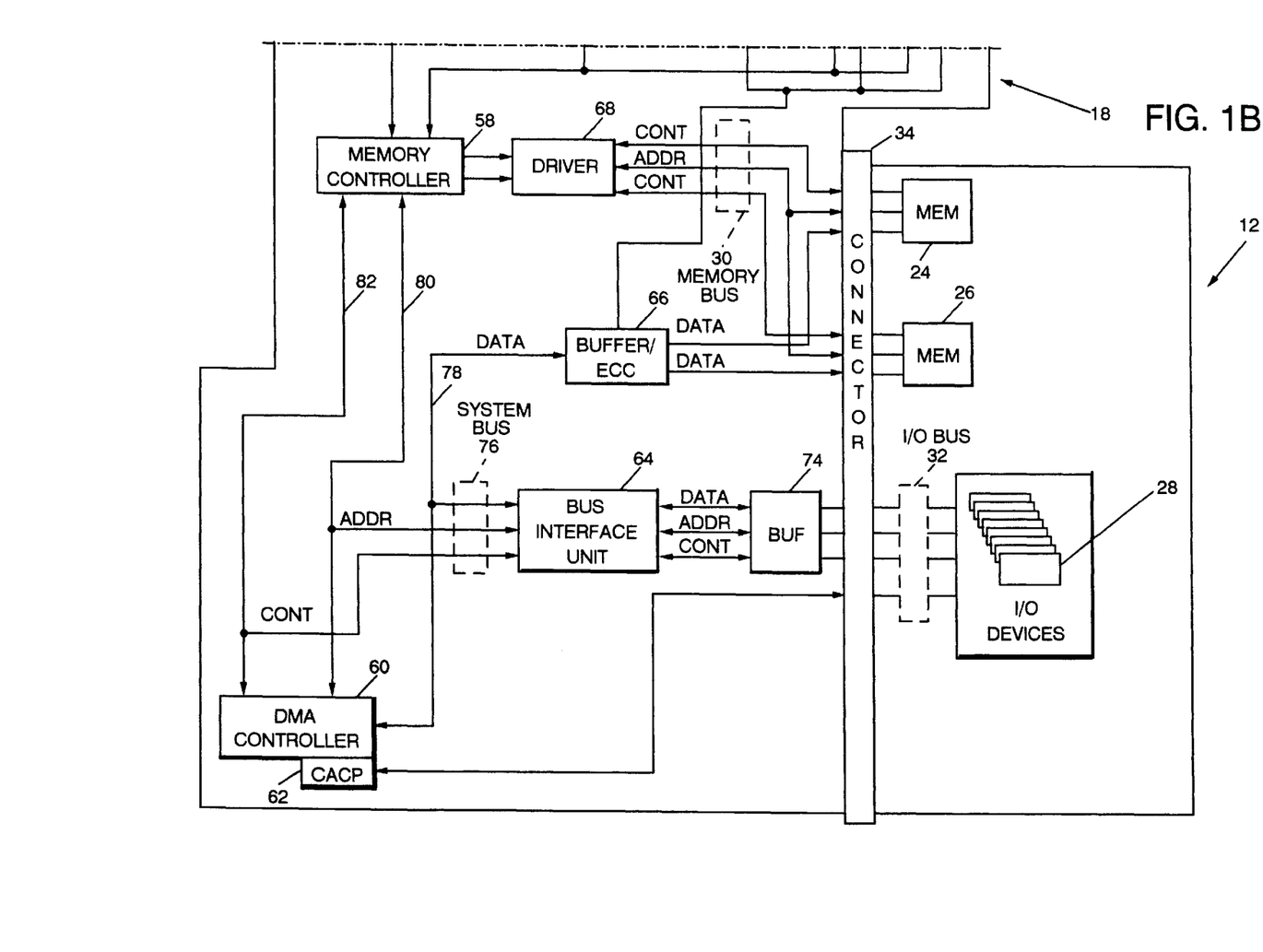

Referring first to FIG. 1, a computer system shown generally at 10 comprises system board 12 and processor complex 14. Processor complex includes processor portion 16 and base portion 18 connected at processor local bus 20 via local bus connector 22. Processor portion 16 operates at 50 MHz and base portion 18 operates at 40 MHz.

System board 12 may include conventional video circuitry, timing circuitry, keyboard control circuitry and interrupt circuitry (none of which are shown) which may be used by computer system 10 during normal operation. System board 12 also includes interleaved system memories 24 and 26 and input/output (I/O) devices 28. Communications between memories 24 and 26 and processor complex 14 are handled by memory bus 30, and communications between I/O devices 28 and processor complex 14 are carried by I/O bus 32. I/O bus 32 may conform to MICRO CHANNEL®, Industry Standard Architecture (ISA), or peripheral computer interface (PCI) computer architecture. Communications between I/O devices and memories 24 and 26 are handled by I/O bus 32, system bus 76 and memory bus 30. Memory bus 30 and I/O bus 32 are connected to processor complex base portion 18 via processor complex connector 34.

The I/O devices 28 connected to I/O bus 32 are contemplated to include a variety of devices, each of which either includes on-board memory or serves as an interface between the I/O bus 32 and memory expansion devices. The I/O devices 28 thereby either include or are connected to expansion memory. As used herein, the term "expansion memory" is meant to include memory directly or indirectly attached to the I/O bus 32 having address locations which are cachable in the processor complex 14.

Figure 2:
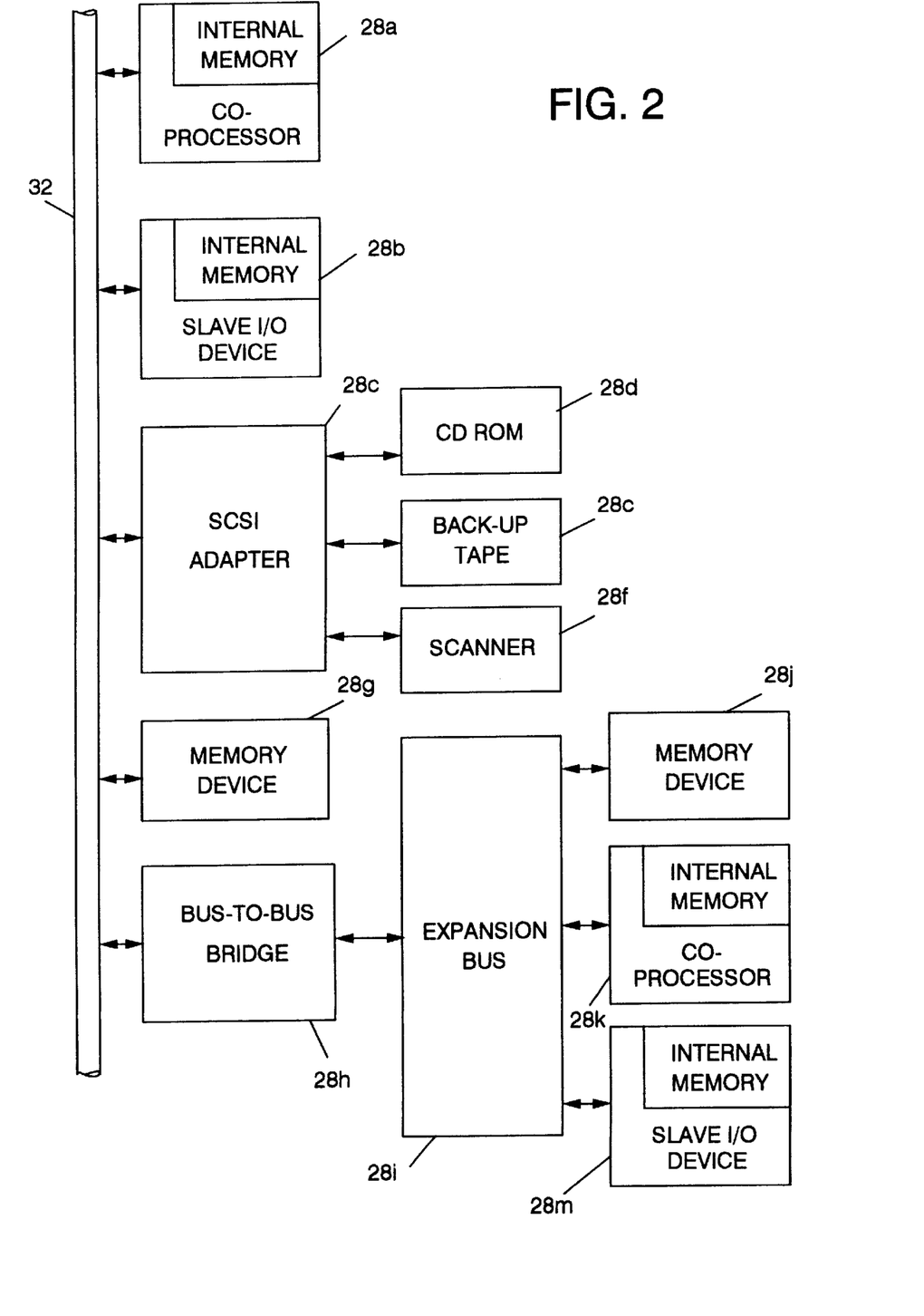
FIG. 2 is a schematic block diagram of memory expansion devices connected to the processor complex connector of the computer system of FIG. 1.

FIG. 2 shows examples of I/O devices 28 which either include or are connected to expansion memory. The examples shown are not intended to be all-inclusive. With respect to I/O devices 28 which are directly attached to the I/O bus 32, such devices may include coprocessing elements (28a) or slave I/O devices (28b) having internal memory contained therein. Directly-attached I/O devices may also include memory devices (28g), such as RAM or ROM cards.

The I/O devices 28 may also include devices which serve to connect expansion memory to the I/O bus 32, such as a small computer system interface (SCSI) adapter (28c), or a bus-to-bus bridge (28h). In the case of the SCSI adapter, expansion memory such as a CD ROM (28d), a back-up tape (28e), or a scanner device (28f) may be attached thereto. The bus-to-bus bridge 28h may be used to connect the I/O bus 32 to an expansion bus (28i), for example, a PCI bus. Expansion memory devices (28j, 28k, 28m), similar to memory devices 28g, 28a and 28b, respectively, are attached to the expansion bus 28i.

Processor portion 16 of processor complex 14 includes central processing unit (CPU) 38 which, in the preferred embodiment, is a 32-bit microprocessor available from Intel, Inc. under the trade designation i486. Processor portion 16 also includes static random access memory (SRAM) 40, cache control module 42, frequency control module 44, address buffer 46 and data buffer 48. Local bus 20 comprises data information path 50, address information path 52 and control information path 54. Data information paths 50 are provided between CPU 38, SRAM 40 and data buffer 48. Address information paths 52 are provided between CPU 38, cache control module 42 and address buffer 46. Control information paths 54 are provided between CPU 38, cache control module 42 and frequency control module 44. Additionally, address and control information paths are provided between cache control module 42 and SRAM 40.

SRAM 40 provides a cache function by storing in short term memory information from either system memories 24 or 26 or from expansion memory which is located on an I/O device 28. Cache control module 42 incorporates random access memory (RAM) 56 which stores address locations of memories 24 and 26. CPU 38 may access information cached in SRAM 40 directly over the local bus 20. Frequency control module 44 synchronizes operation of the 50 Mhz processor portion 16 with the 40 MhZ base portion 18 and also controls the operation of buffers 46 and 48. Accordingly, frequency control module 44 determines the times at which information is captured by buffers 46 and 48 or the times at which information that is stored in these buffers is overwritten. Buffers 46 and 48 are configured to allow two writes from memories 24 and 26 to be stored simultaneously therein. Buffers 46 and 48 are bi-directional, i.e., they are capable of latching information which is provided by the CPU 38 and information which is provided to the CPU. Because buffers 46 and 48 are bi-directional, processor portion 16 of the processor complex 14 may be replaced or upgraded while maintaining a standard base portion 18.

Base portion 18 includes memory controller 58, direct memory access (DMA) controller 60, central arbitration control point (CACP) circuit 62, bus interface unit 64 and buffer/error correction code (ECC) circuit 66. Base portion 18 also includes driver circuit 68, read only memory (ROM) 70, self test circuit 72 and buffer 74. System bus 76 comprises a data information path 78, and address information path 80 and a control information path 82. The data information path connects buffer 74 with bus interface unit 64; bus interface unit 64 with DMA controller 60 and buffer/ECC circuit 66; and buffer/ECC circuit 66 with system memories 24 and 26. The address information path and the control information path each connect memory controller 58 with DMA controller 60 and bus interface unit 64; and bus interface unit 64 with buffer 74.

Memory controller 58 resides on both CPU local bus 20 and system bus 76, and provides the CPU 38, the DMA controller 60 or bus interface unit 64 (on behalf of an I/O device 28) with access to system memories 24 and 26 via memory bus 30. The memory controller 58 initiates system memory cycles to system memories 24 and 26 over the memory bus 30. During a system memory cycle, either the CPU 38, the DMA controller 60 or bus interface unit 64 (on behalf of an I/O device 28 ) has access to system memories 24 and 26 via memory controller 58. The CPU 38 communicates to system memory via local bus 20, memory controller 58 and memory bus 30, while the DMA controller 60 or bus interface unit 64 (on behalf of an I/O device 28 ) access system memory via system bus 76, memory controller 58 and memory bus 30.

For CPU 38 to I/O bus 32 read or write cycles, address information is checked against system memory address boundaries. If the address information corresponds to an I/O expansion memory address or I/O port address, then memory controller 58 initiates an I/O memory cycle or I/O port cycle with an I/O device 28 (via bus interface unit 64 ) over the I/O bus 32. During a CPU to I/O memory cycle or I/O port cycle, the address which is provided to memory controller 58 is transmitted from system bus 76 to I/O bus 32 via bus interface unit 64 which resides intermediate these two buses. The I/O device 28 which includes the expansion memory to which the address corresponds receives the memory address from I/O bus 32. DMA controller 60 and the bus interface unit 64 control the interchange of information between system memories 24 and 26 and expansion memory which is incorporated into an I/O device 28. DMA controller 60 also provides three functions on behalf of processor complex 14. First, the DMA controller 60 utilizes a small computer subsystem control block (SCB) architecture to configure DMA channels, thus avoiding the necessity of using programmed I/O to configure the DMA channels. Second, DMA controller provides a buffering function to optimize transfers between slow memory expansion devices and the typically faster system memory. Third, DMA controller 60 provides an eight channel, 32-bit, direct system memory access function. When providing the direct system memory access function, DMA controller 60 may function in either of two modes. In a first mode, DMA controller 60 functions in a programmed I/O mode in which the DMA controller is functionally a slave to the CPU 38. In a second mode, DMA controller 60 itself functions as a system bus master, in which DMA controller 60 arbitrates for and controls I/O bus 32. During this second mode, DMA controller 60 uses a first in, first out (FIFO) register circuit.

CACP circuit 62 functions as the arbiter for the DMA controller, I/O device bus controllers and the CPU (if accessing I/O devices). CACP circuit 62 receives arbitration control signals from DMA controller 60, memory controller 58 as well as from I/O devices, and determines which devices may control the I/O bus 32 and the length of time during which the particular device will retain control of the I/O bus.

Driver circuit 68 provides control information and address information from memory controller 58 to system memories 24 and 26. Driver circuit 68 drives this information based upon the number of single in-line memory modules (SIMMs) which are used to construct system memories 24 and 26. Thus, driver circuit 68 varies the signal intensity of the control and address information which is provided to system memories 24 and 26 based upon the size of these memories.

Buffer circuit 74 provides amplification and isolation between processor complex base portion 18 and system board 12. Buffer circuit 74 utilizes buffers which permit the capture of boundary information between I/O bus 32 and bus interface unit 64 in real time. Accordingly, if computer system 10 experiences a failure condition, buffer circuit 74 may be accessed by a computer repair person to determine the information which was present at connector 34 upon failure of the system.

ROM 70 configures the system 10 upon power-up by initially placing in system memory data from expansion memory. Self test circuit 72, which is connected to a plurality of locations within base portion 18, provides a plurality of self test features. Self test circuit 72 accesses buffer circuit 74 to determine if failure conditions exist, and also tests the other major components of base portion 18 upon power-up of the system 10 to determine whether the system is ready for operation.

Figures 3, 3A:
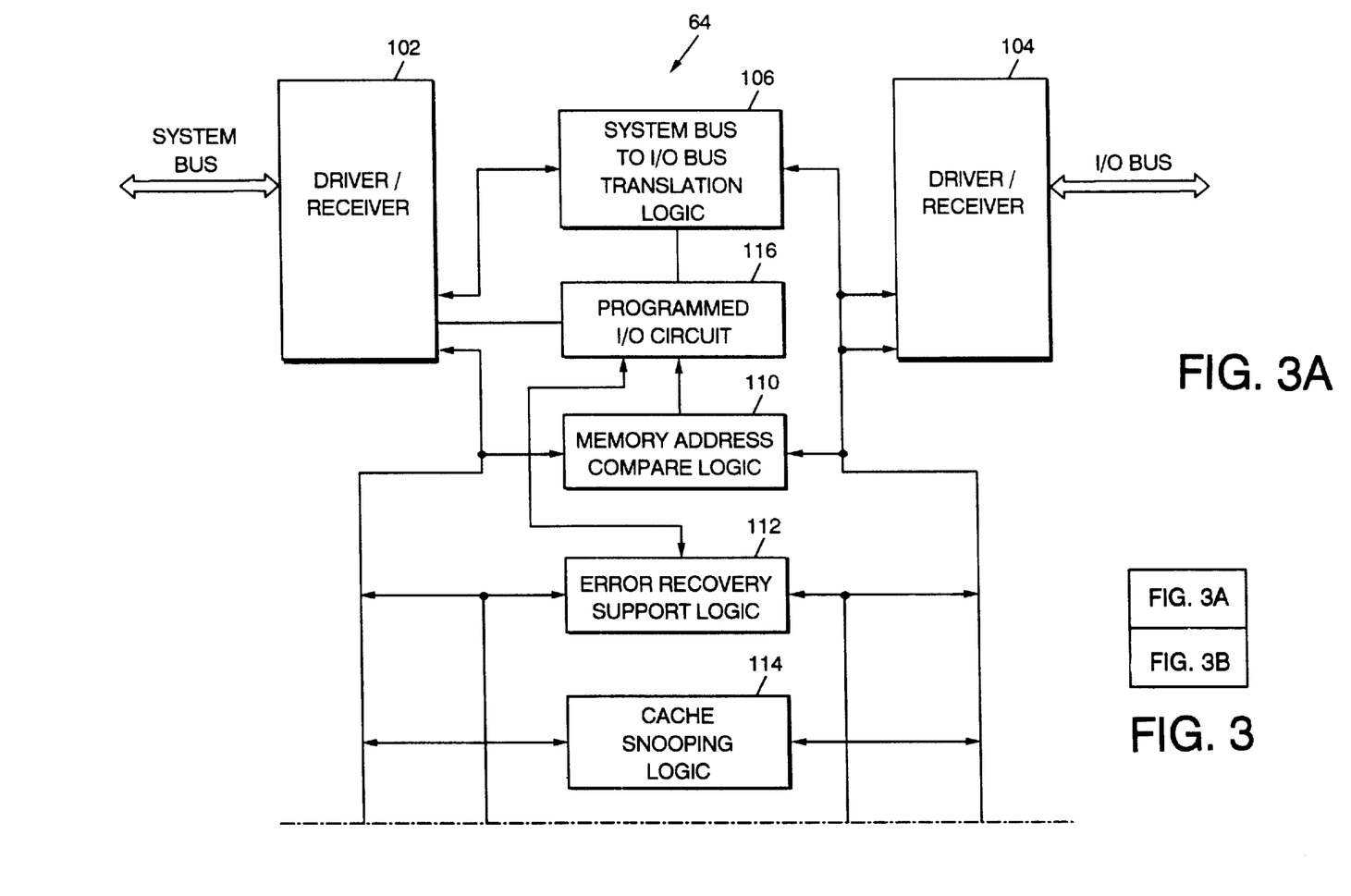
FIG. 3 is a schematic block diagram of the bus interface unit of the computer system of FIG. 1.
Figure 3B:
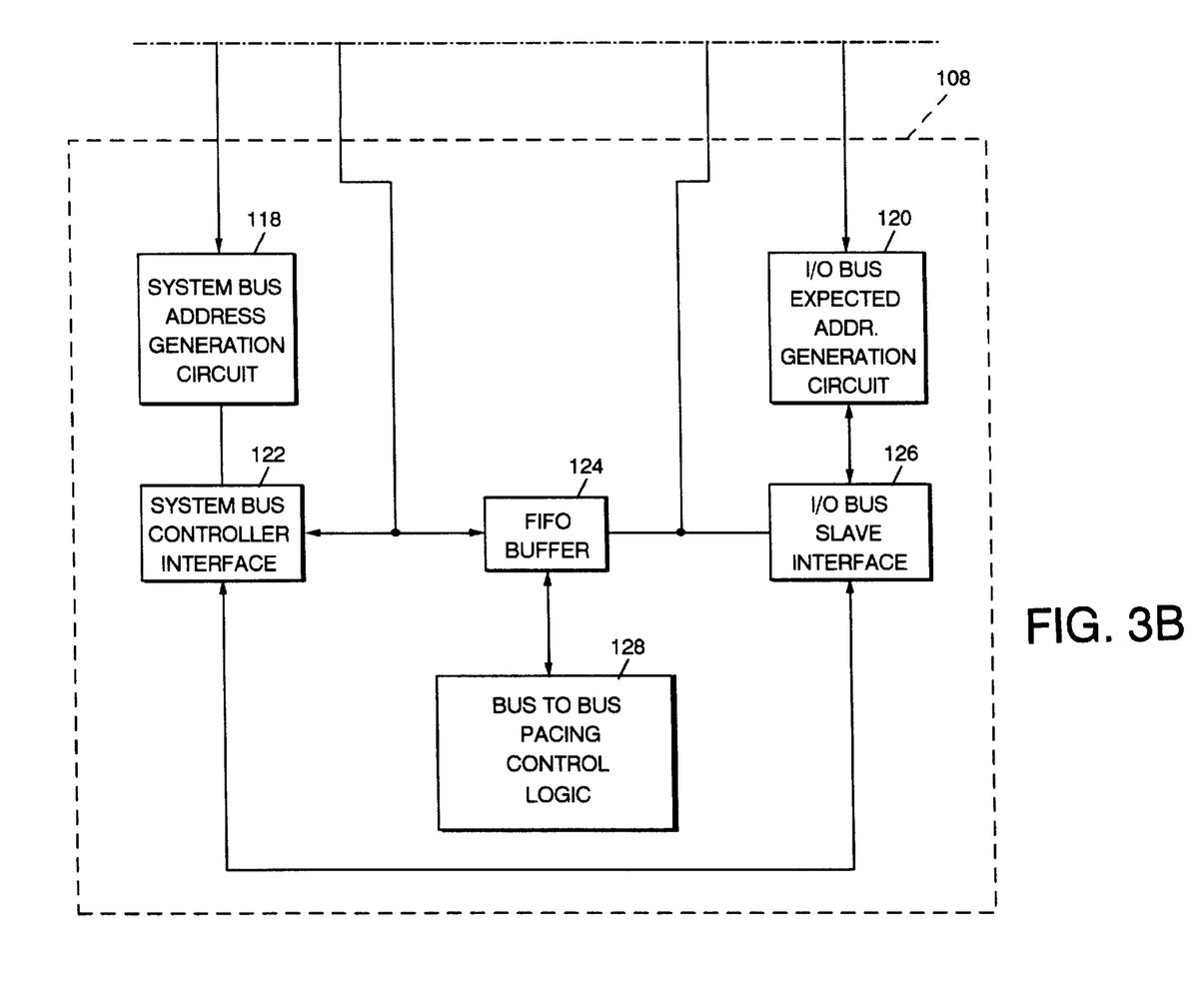

Referring to FIG. 3, a schematic block diagram of the bus interface unit 64 of the system of FIG. 1 is shown. Bus interface unit 64 provides the basis for implementation of the present invention by providing a bi-directional high speed interface between system bus 76 and I/O bus 32.

Bus interface unit 64 includes system bus driver/receiver circuit 102, I/O bus driver/receiver circuit 104 and control logic circuits electrically connected therebetween. Driver/receiver circuit 102 includes steering logic which directs signals received from the system bus 76 to the appropriate bus interface unit control logic circuit and receives signals from the bus interface unit control logic circuits and directs the signals to the system bus 76. I/O bus driver/receiver circuit 104 includes steering logic which directs signals received from the I/O bus 32 to the appropriate bus interface unit control logic circuit and receives signals from the bus interface unit control logic circuits and directs the signals to the I/O bus 32.

The bus interface unit control logic circuits include system bus to I/O bus translation logic 106, I/O bus to system bus translation logic 108, memory address compare logic 110, error recovery support logic 112, and cache snooping logic 114. Programmed I/O circuit 116 is also electrically coupled to system driver/receiver circuit 102.

The system bus to I/O bus translation logic 106 provides the means required for the DMA controller 60 or the memory controller 58 (on behalf of CPU 38 ) to act as a system bus controller to access the I/O bus 32 and thereby communicate with I/O devices 28 acting as slave devices on the I/O bus. Translation logic 106 translates the control, address and data lines of the system bus 76 into similar lines on the I/O bus 32. Most control signals and all address signals flow from the system bus 76 to the I/O bus 32 while data information flow is bi-directional. The logic which acts as system bus slave monitors the system bus 76 and detects cycles which are intended for the I/O bus 32. Upon detection of such a cycle, the system bus slave translates the timing of signals on the system bus to I/O bus timing, initiates the cycle on the I/O bus 32, waits for the cycle to be completed, and terminates the cycle on the system bus 76.

The I/O bus to system bus translation logic 108 comprises system bus address generation circuit 118, I/O bus expected address generation circuit 120, system bus controller interface 122, FIFO buffer 124, I/O bus slave interface 126 and bus to bus pacing control logic 128. System bus controller interface 122 supports a high performance 32 bit (4 byte) i486 burst protocol operating at 40 MHZ. Data transfers of four, eight and sixteen bytes in burst mode and one to four bytes in no-burst mode are provided. I/O bus slave interface 126 monitors the I/O bus 32 for operations destined for slave devices on the system bus 76 and ignores those operations destined for the I/O bus 32. All cycles picked up by the I/O bus slave interface 126 are passed on to the FIFO buffer 124 and the system bus controller interface 122.

The I/O bus to system bus translation logic 108 provides the means required for an I/O device 28 to act as an I/O bus controller to access system bus 76 and thereby read or write to system memories 24 and 26. In either of these operations, an I/O device controls the I/O bus. The asynchronous I/O bus interface 126, operating at the speed of the I/O device, permits the bus interface unit 64 to act as a slave to the I/O device controller on the I/O bus 32 to decode the memory address and determine that the read or write cycle is destined for system memories 24 or 26. Simultaneously, the system bus controller interface 122 permits the bus interface unit 64 to act as a controller on the system bus 74. The memory controller 58 (FIG. 3) acts as a slave to the bus interface unit 64, and either provides the interface 64 with data read from system memory or writes data to system memory. The reads and writes to system memory are accomplished through the FIFO buffer 124, a block diagram of which is illustrated in FIG. 4.

Figure 4:
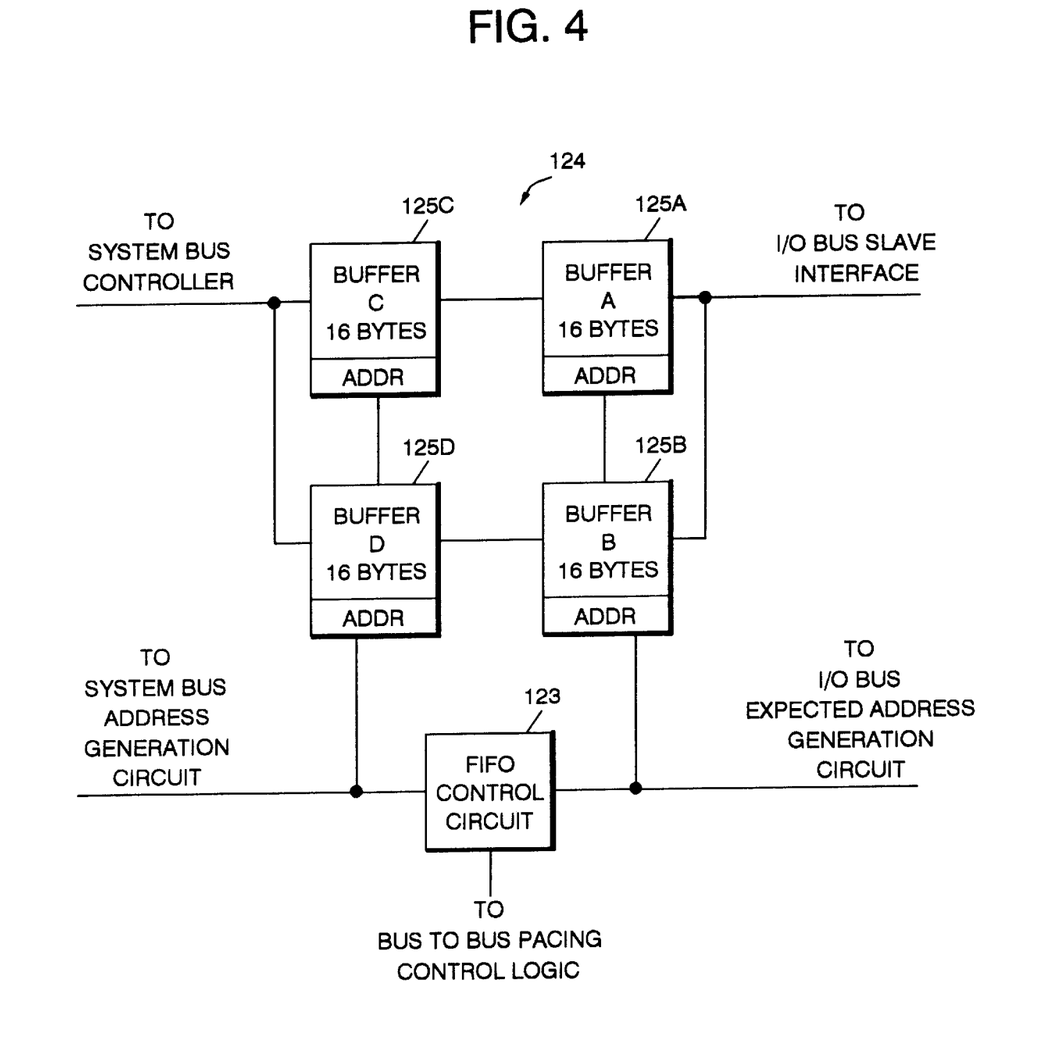
FIG. 4 is a schematic block diagram of the FIFO buffer of the bus interface unit of FIG. 3.

As shown in FIG. 4, FIFO buffer 124 is a dual ported, asynchronous, bi-directional storage unit which provides temporary storage of data information between the system and I/O buses 76, 32. FIFO buffer 124 comprises four sixteen-byte buffers 125A–125D and FIFO control circuit 123. The four buffers 125A–125D buffer data to and from I/O bus controllers and system bus slaves, thereby allowing simultaneous operation of the I/O bus 32 and the system bus 76. The FIFO buffer 124 is physically organized as two thirty-two byte buffers (125A/125B and 125C/125D). The system bus controller interface 122 and the I/O bus slave interface 126 each control one thirty-two byte buffer while the other thirty-two byte buffer operates transparent to them. Both of the thirty-two byte buffers are utilized for read and write operations.

Each FIFO 124A, 125B, 125C, 125D has an address register section either physically associated with the respective FIFO, or logically associated therewith. As data is transferred from the I/O bus 32 to FIFO 125A, the data will be accumulated until the 16 byte buffer is filled with 16 bytes of data, provided that the addresses are contiguous. If a non-contiguous address is detected by the address action, the FIFO 125A will transfer the stored data to FIFO 125C, and at the same time FIFO 125B will start to receive this data from the new non-contiguous address. FIFO 125B will continue just as FIFO 125A did until it is filled with 16 bytes of data, or another non-contiguous address is detected. FIFO 125B will then transfer the stored data to FIFO 125D, and FIFO 125A again starts to store data; thus, it is possible to store up to four 16 byte blocks of non-contiguous address data.

Further, by having two 32 byte buffers in parallel the reading and writing of data can be toggled between them thus giving an essentially continuous read or write function.

Moreover, by splitting the 32 byte buffers into two 16 bytes buffer sections which are coupled to other I/O bus 32 or system bus 26, the number of storage buffers can be increased with minimal impact on the performance of the FIFO as related to the capacitive loading on signals clocking data in or out of the storage registers. This is accomplished because for every two buffers added (in parallel) only half the capacitive loading is added to the loading of clock signals on each bus.

Additionally, by having two 16 byte buffers in series in each leg, once one of the 16 byte buffers is filled with data, such as in a read operation, the data can be transferred to the other 16 byte buffers in series therewith, while the other parallel leg is accumulating data. Hence, there is no time lost in either accumulating data, or transferring the data from one bus to the other.

The logic for controlling the operation of the FIFO 124 is supplied by FIFO Control Circuit 123.

A particular I/O device 28 may write to system memories 24 or 26 via I/O bus in bandwidths of either 1, 2 or 4 bytes (i.e., 8, 16 or 32 bits). During writes to system memory by an I/O device 28, the first transfer of write data is initially stored in the FIFO buffer 125A or 125B. The I/O bus expected address generation circuit 120 calculates the next expected, or contiguous, address. The next contiguous address is checked against the subsequent I/O address to verify if the subsequent transfers are contiguous or not. If contiguous, the second byte or bytes of write data is sent to the same FIFO buffer 125A or 125B. The FIFO receives data at asynchronous speeds of up to 40 megabytes per second from the I/O bus 32.

This process continues until either buffer 125A or 125B is full with a 16-byte packet of information or a non-contiguous address is detected. On the next clock cycle, assuming that buffer 125A is full, the data in buffer 125A is transferred to buffer 125C. Similarly, when buffer 125B is full, all of its contents are transferred to buffer 125D in a single clock cycle. The data stored in the buffers 125C and 125D is then written to system memory via an i486 burst transfer at the system bus operational speed. The operation of FIFO buffer 124 during a write to system memory by an I/O device is thus continuous, alternating between buffers 125A and 125B, with each emptying into adjacent buffer 125C or 125D, respectively, while the other is receiving data to be written to system memory. The FIFO buffer 124, then, optimizes the speed of data writes to system memory by (i) anticipating the address of the next likely byte of data to be written into memory and (ii) accommodating the maximum speed of write data from the FIFO buffer to system memory via the system bus 76.

During reads of data from system memory to an I/O device 28, FIFO buffer 124 operates differently. The system bus address generation circuit 118 uses the initial read address to generate subsequent read addresses of read data and accumulate data in buffer 125C or 125D. Because the system bus supports transfers in bandwidths of 16 bytes wide, the system bus controller interface 122 may prefetch 16-byte packets of contiguous data and store it in buffers 125C or 125D without the I/O bus 32 actually providing subsequent addresses, thus reducing latency between transfers. When buffer 125C is full of prefetched data, it transfers its contents to buffer 125A in one clock cycle. Buffer 125D similarly empties into buffer 125B when full. The data in buffers 125A and 125B may then be read by a particular I/O device controller in bandwidths of 1, 2 or 4 bytes. In this way, system bus address generation circuit 118 functions as an increment counter until instructed to by the I/O controller device to stop prefetching data.

Bus to bus pacing control logic 128 creates a faster access to system memory for high speed I/O devices. The bus to bus pacing control logic 128 overrides the normal memory controller arbitration scheme of system 10 by allowing an I/O device in control of the I/O bus 32 uninterrupted access to system memory during transfers of data by faster devices which require multiple cycles, rather than alternating access to the memory controller 58 between the I/O device and the CPU. Thus, even if a local device such as the CPU has a pending request for control of the memory bus during a multiple cycle transmission by an I/O device, the bus to bus pacing control logic 128 will grant the I/O device continued control of the memory bus.

The programmed I/O circuit 116 is the portion of the bus interface unit 64 which contains all of the registers which are programmable within the bus interface unit 64. The registers have bits associated therewith to determine whether a particular register is active or inactive. These registers define, inter alia, the system memory and expansion memory address ranges to which the bus interface unit 64 will respond, the expansion memory addresses which are either cachable or noncachable, the system memory or cache address ranges, and whether or not parity or error checking is supported by the bus interface unit. Accordingly, programmed I/O circuit 116 identifies for the bus interface unit 64 the environment in which it resides, and the options to which it is configured. The registers in programmed I/O circuit 116 cannot be programmed directly over the I/O bus 32. Hence, in order to program the system 10, the user must have access to an I/O device which may communicate over the system bus to the programmed I/O circuit 116 at the CPU level.

Memory address compare logic 110 determines if a memory address corresponds to system memory or corresponds to expansion memory which is located on I/O device 28 coupled to the I/O bus 32. Because the system memory as well as the expansion memory may be in non-contiguous blocks of addresses, memory address compare logic 110 includes a plurality of comparators which are loaded with boundary information from registers in the programmed I/O circuit 116 to indicate which boundaries correspond to which memory. After a particular memory address is compared with the boundary information by the memory address compare logic, the bus interface unit is prepared to react accordingly. For example, if an I/O device controlling the I/O bus 32 is reading or writing to expansion memory, the bus interface circuit need not pass that address to the memory controller 58, thereby saving time and memory bandwidth.

Error recovery support logic 112 permits the system 10 to continue operations even if a data parity error is detected. On any read or write access by an I/O device 28 to system memories 24 or 26, parity of the data is checked. Support logic 112 interacts with a register in the programmed I/O circuit 116 for capturing the address and the time of the detected parity error. The contents of this register may then be acted upon by appropriate system software. For example, the CPU 38 may be programmed for a high level interrupt to pull the address out of the register at any time a parity error is detected. The CPU may then decide, based on the system software instructions, whether to continue system operations or merely terminate operation of the identified source of the parity error.

Cache snooping logic 114 permits the bus interface unit 64 to monitor the I/O bus 32 for any writes to expansion memory by an I/O device taking place over the I/O bus 32. The snooping logic first determines if the write to expansion memory occurred in expansion memory which is cachable in SRAM 40. If it is not cachable expansion memory, there is no danger of corrupt data being cached. If, however, a positive compare indicates that the write occurred in cachable expansion memory, a cache invalidation cycle is initiated over the system bus 76. The CPU is thus instructed to invalidate the corresponding address in SRAM 40. Cache snooping logic 114 provides means to store the address of a positive compare so that snooping of the I/O bus may continue immediately after detection of the first positive compare, thereby permitting continuous monitoring of the I/O bus 32.

The cache snooping logic 114, sometimes referred to herein as snoop/data invalidation or data invalidation/snoop logic, is provided to allow certain ranges of addresses of devices 28 coupled to the I/O bus 32 to be cached in the cache of the CPU complex 14, and the address of the cachable memory location in the device coupled to the I/O bus to be written on the system bus when any such cachable memory location is rewritten from a device coupled to the I/O bus. A range or ranges of addresses of memory contained in any device coupled to the I/O bus and identified as being "cachable" memory locations is stored in the bus interface unit 64. Thereafter, at anytime a device coupled to the I/O bus writes to any of the identified cachable addresses in devices coupled to the I/O bus, a cache invalidation signal is generated, and that address is written on the system bus and transmitted to the CPU complex 14 indicating that any previously cached data from that address is invalid. The CPU complex 14 can get rid of the previously cached data and at an appropriate time replace it with the rewritten data from that address or take whatever other action is programmed into the CPU complex 14.

Figure 5:
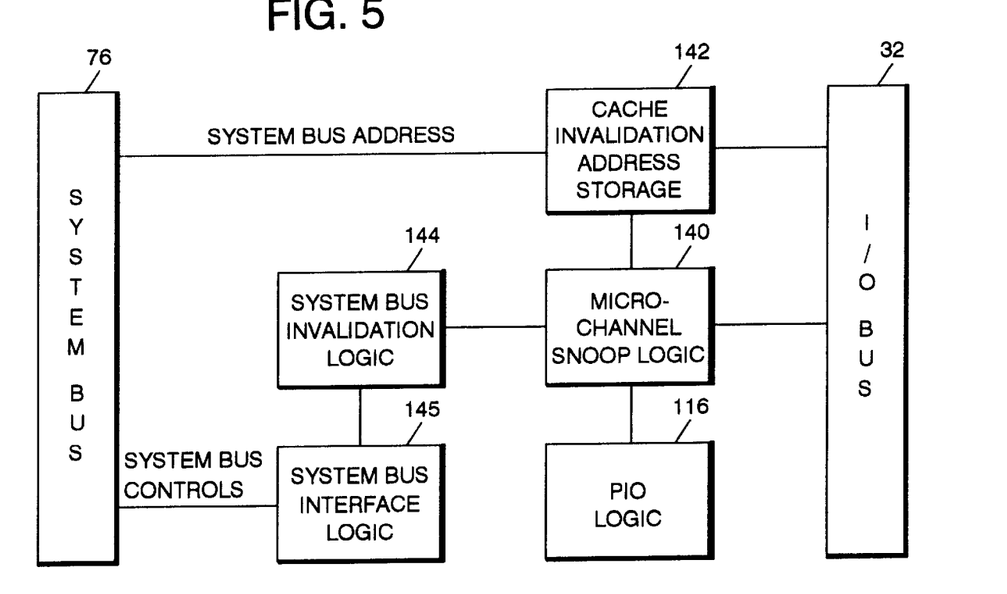
FIG. 5 is a high level schematic block diagram of the data invalidation/snoop function according to the present invention.

FIG. 5 depicts, at a high level, the logic involved in performing this function. I/O bus "snoop" logic 140 monitors all of the transmissions on the I/O bus. The logic determines first if an I/O device is an I/O bus master, next if it is performing a write operation, and finally if it is writing to a cachable memory location of a device coupled to the I/O bus. If all of these conditions are met, a cache invalidation signal, known as a positive snoop, is generated and the address being written to in the memory device coupled to the I/O bus is stored in a cache invalid address storage register 142. The invalid address is then written on the system bus 76 by system bus invalidation logic 144 and system bus interface logic 145 and transmitted to the CPU complex 14 by memory controller 58.

Figure 6:
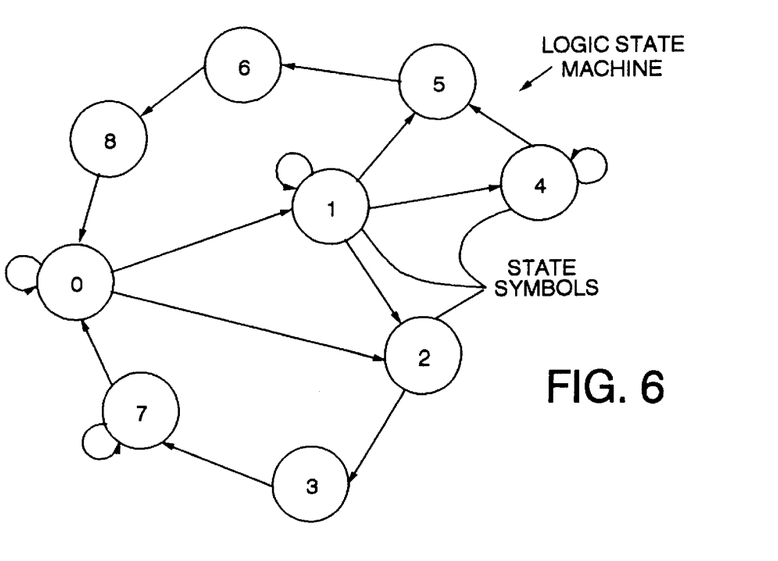
FIG. 6 is a logic diagram of the state machine for performing the data invalidate/snoop function of this invention.

The logic function is performed by a cache snoop/invalidation state machine shown in FIG. 6. In this logic diagram, state 0 represents the normal at rest "power on" state of the machine. When the system is initially powered, a "reset" signal maintains the state machine in this "at rest" or 0 state. It will remain in this "at rest" state until a signal is received indicating that a device coupled to the I/O bus is performing a write function to a cachable memory address in a device coupled to the I/O bus. The state machine then goes to either state 2 or state 1 depending upon whether the system bus 76 is "free" (i.e. no device has control of the system bus 76) or is "occupied" (i.e. some device has control of the system bus 76). In either case, the memory address of the data being written is stored in an address register (which will be described presently). If the system bus 76 is free, the state machine goes to state 2 which generates a signal on the system bus 76 to the memory controller 58 to store the address and then goes to state 3 which allows the address in the register to be valid for another timing pulse. States 2 and 3 constitute an "address invalidation" condition. The state machine then goes to state 7 wherein the address is held in the register 142 until all of the data has been written from the device controlling the I/O bus to the indicated address on the I/O bus during the write cycle.

However, if at the time that a cached address signal is received the system bus 76 is "occupied", the state machine goes to state 1. It remains in this state until the system bus 76 is free. If the system bus becomes free before the data transfer cycle which is writing to the cachable address is completed, the machine goes from state 1 to state 2, and then to state 3 and then to state 7 as previously described. If the system bus becomes free at the same time the data transfer is completed, the state machine goes from state 1 to state 5, which is similar to state 2 which will actuate memory controller 58 to store the invalidation address; and then the state machine goes the address is valid for an additional pulse. States 2 and 3 and also state 5 and 6 are address invalidation states. From state 6 the state machine goes to state 8. This delays the return to the 0 state for one timing pulse. This is necessary for timing. The state is then returned to state 0.

If, on the other hand, the state machine is in state 1 and the first snooped I/O data transfer cycle is completed before the system bus 76 is available, the state machine goes to state 4. The machine stays in state 4 until the system bus is free at which time it goes to state 5, and then to states 6 and 8 as previously described.

In order to insure that additional snoop addresses are not lost while the state machine is either waiting for the system bus 76 or in the process of executing an invalidation cycle, if a second positive snoop is encountered, the address of this second positive snoop will be queued in register 152, while the first stored address will be held in register 156. This second address will only be transferred after the first snooped address has been put onto the system bus 76.

Figure 7:
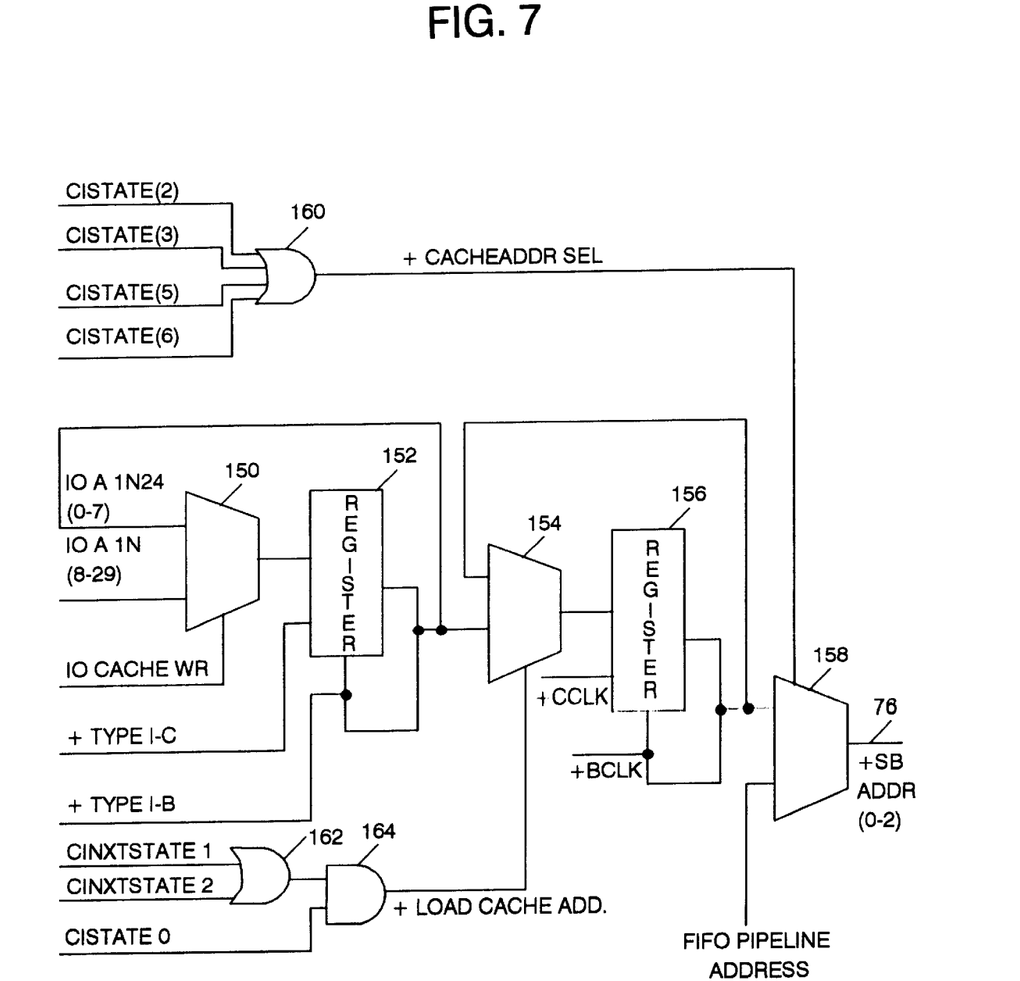
FIG. 7 is a circuit diagram of the controlling devices of the address invalidate snoop function.
Figure 8:
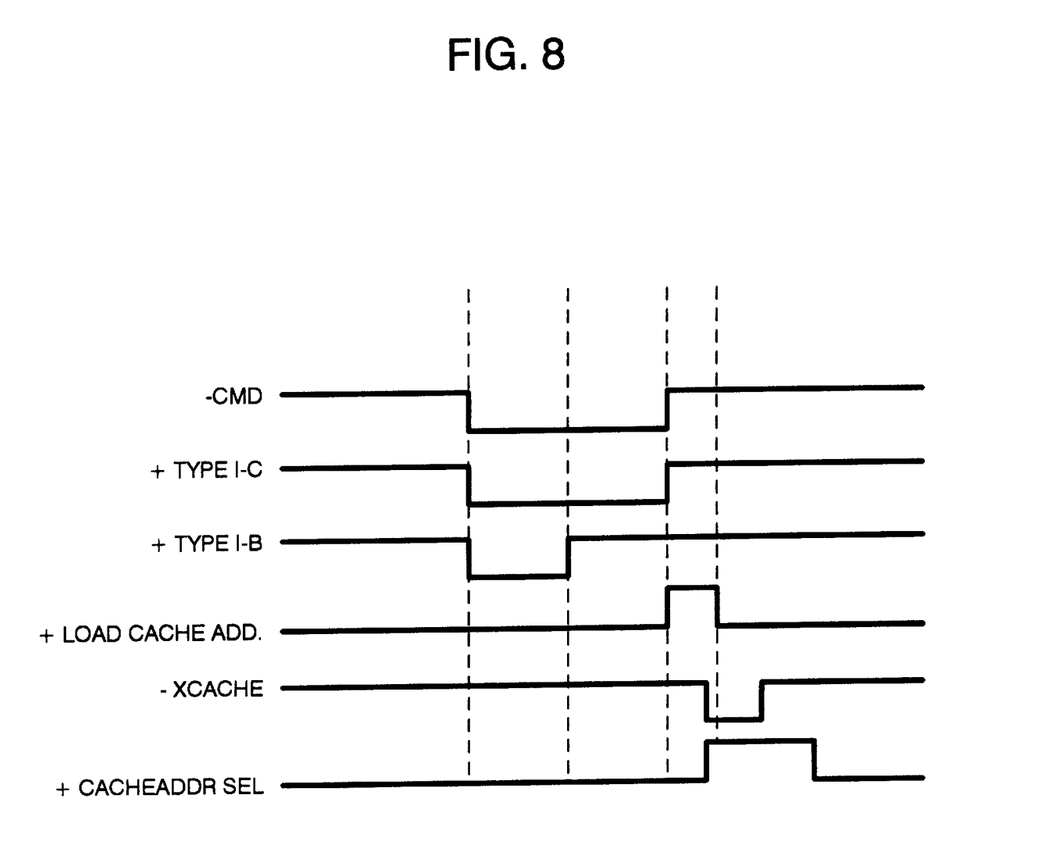
FIG. 8 is a timing diagram showing the occurrence of a positive data invalidation/snoop.

The output of the state machine controls the logic function shown in FIG. 7 which stores the invalidation address. The logic function performing structure includes a first multiplexer 150, the output of which is connected to a first address register 152. The output of the first address register 152 is connected to a second multiplexer 154, the output of which is connected to a second address register 156. The output of the second address register 156 is connected to a third multiplexer 158, the output of which is communicated to the system bus 76.

The state machine controls a first OR gate 160 to drive the select input of multiplexer 158. The first OR gate 160 has four input lines which can provide an output to the select input of the multiplexer 158 to transfer the data invalidation address to the system bus 76. OR gate 162 is provided with input from the next state of the state machine. The output of the OR gate 162 is an input to AND gate 164. The output of the AND gate 164 is connected to select input of the multiplexer 154.

Briefly, the logic performs as follows: When a positive snoop occurs, the address of the data is written into register 152. If the state machine is in state 0 and the next state is either 1 or 2, the address is immediately transferred to register 156 where it remains until the system bus 76 is free at which time it is written through multiplexer 158 to the system bus. If when the data address is received in register 152, the state machine is in state 4, i.e. awaiting access to the system bus, which signifies that the address of a first routine snoop is in the register 156 awaiting transfer to the system bus 76, the second snooped address is retained in register 152 and not moved to register 156 until the state machine has gone to state 0.

The signal description for the cache data invalidation function of state (CISTATE) 0 through 6 on the lines are as follows:

| CACHE INVALIDATE | |
| --- | --- |
| STATE(0–6) (CISTATE) | 1 = state is currently active<br>0 = state is not active |
| I/O CACHE - WR | 1 = current I/O bus address is in the cachable memory range<br>0 = non-cachable address is on I/O bus |
| TYPE IC | |
| TYPE IB | 1 = clock pulses to the bus interface unit 64 based on I/O internal command signal |
| CINXT + STATE (CINXTSTATE) | 1 = next active state of state machine is 1<br>0 = next active state of state machine is not 1 |
| I/O A IN | = I/O address coming to bus interface unit 64 |
| SYSTEM BUS ADDR (SB ADDR) | = system has address being written by bus interface unit 64 to system bus |
| X CACHE | = positive snoop signal written onto system bus |

With this logic function, a write to cached data address is detected and stored and the appropriate signal is placed onto the system bus 76.

Although several embodiments of this invention have been shown and described, various adaptations and modifications can be made without departing from the scope of the invention as defined in the appended claims.

Having thus described the preferred embodiment, the invention is now claimed to be:

1. A computer system comprising a central processing unit (CPU) complex, a system memory coupled to said CPU complex; an expansion bus in circuit communication with the CPU complex and having at least one expansion memory device coupled thereon; said central processing unit (CPU) complex comprising:
 (a) a cache;
 (b) a system bus;
 (c) an input/output (I/O) bus; and
 (d) a bus interface unit coupled between said system bus and said I/O bus; wherein said bus interface unit comprising:
  (1) means for identifying memory locations in said expansion memory device which are cacheable in the CPU complex;
  (2) data invalid/snoop logic for monitoring transmission on said I/O bus and said expansion bus and for determining when a data write operation to a cacheable memory location in said expansion memory device has occurred and the address of the cacheable memory location being written into; and
  (3) means for writing the address of said cacheable memory location on the system bus when said location is identified and the system bus is available.

2. The computer system as defined in claim 1 wherein said bus interface unit includes an address register to store the address of said cacheable memory location being written into.

3. The computer system as defined in claim 2 wherein said data invalid/snoop logic includes means for monitoring the system bus, and retaining the address of said cacheable memory location being written into in said address register until the system bus is free.

4. The computer system as defined in claim 3 wherein said data invalid/snoop logic further includes logic for storing said address in said address register and preventing entry of any subsequent address of a data write operation to a cacheable memory location in said address register until said address of said cacheable memory location being written into has been written on the system bus.

5. The computer system as defined in claim 4 wherein said address of the cacheable memory location being written into is a first address and the bus interface unit further including a second address register for storing a subsequently determined address of a cacheable memory location prior to said first address being written on the system bus.

6. A method of providing cacheable memory in a device coupled to an I/O bus in a computer system having central processing unit (CPU) complex and an expansion bus in circuit communication with the CPU complex and having at least one expansion memory device coupled thereon; the CPU complex comprising:
   a cache;
   a system bus;
   an input/output (I/O) bus; and
   a bus interface unit coupled between said system bus and said I/O bus) the method comprising the steps of:
      (a) identifying memory locations in said expansion memory devices which are cacheable;
      (b) monitoring transmissions on said I/O bus and said expansion bus to determine when a data write operation to a cacheable memory location in said expansion memory device has occurred and the address of the cacheable memory location being written into; and
      (c) writing the address of said cacheable memory location being written into on the system bus when said location is identified and the system bus is available.

7. The method as defined in claim 6 further including the step of storing the address of said cacheable memory location being written into in an address register in said bus interface unit.

8. The method as defined in claim 7 further including the steps of monitoring the system bus, and storing said address of the cacheable memory location being written into in said register until the system bus is free.

9. The method as defined in claim 8 wherein said address of the cacheable memory location being written into is a first address, and said method further includes the step of preventing entry of any subsequent address of a data write operation to a cacheable memory location in said register until the first address has been written on the system bus.

10. The method as defined in claim 9 further including the step of storing an address of a second cacheable memory location in a second address register if the first address has not been written to the system bus.

11. A computer system containing: a central processing unit (CPU), a cache coupled to said CPU, and system memory coupled to said CPU; said computer system further comprising:
   (a) an input/output (I/O) bus for connecting said computer system to I/O devices and to expansion memory devices on an expansion bus; said I/O bus supporting memory data transfers between said I/O devices and said cache, I/O and memory data transfers between pairs of said I/O devices, and I/O and memory data transfers between pairs of said expansion memory devices, and said memory data transfers between said I/O devices and said cache including data transfers between cacheable memory locations contained in said I/O devices and memory locations contained in said cache, and said memory data transfers between said pairs of I/O devices including data transfers between one I/O device controlling said I/O bus and cacheable memory locations contained in another I/O device, and said memory data transfers between pairs of expansion memory devices including data transfers between one expansion memory device controlling said expansion bus and cacheable memory locations contained in another expansion memory device;
   (b) a bus interface unit coupled between said I/O bus and said cache; said bus interface unit comprising:
      (1) means for identifying said cacheable memory locations contained in said I/O devices and said expansion memory devices;
      (2) bus snooping logic, in circuit communication with said I/O bus, said expansion bus, and said means for identifying said cacheable memory locations, for monitoring said memory data transfers on said I/O bus between pairs of said I/O devices and for monitoring said memory data transfers on said expansion bus between pairs of said expansion memory devices, and detecting when data is being written by said one I/O device controlling said I/O bus to a cacheable memory location contained in said another I/O device, and detecting when data is being written by said one expansion memory device controlling said expansion bus to a cacheable memory location contained in said another expansion memory device; and
      (3) invalidation signaling logic means responsive to detection by said bus snooping logic that data is being written by said one expansion memory device to a cacheable memory location contained in another said expansion memory device for directing an invalidation signal to said cache; said invalidation signal including the address of the cacheable memory location in said another expansion memory device to which data is being written and serving to cause invalidation of a location in said cache corresponding to said address if said cache currently contains a location corresponding to said address.

12. The computer system as defined in claim 11 wherein said bus interface unit further comprises an address register coupled to said bus snooping logic for storing said addresses detected by said bus snooping logic representing said cacheable memory locations in said another expansion memory device to which data is being written to permit transfer of said invalidation signals to said cache in asynchronous relation to execution of corresponding memory data transfers between pairs of said expansion memory devices.

13. The computer system as defined in claim 12 further comprising a system bus located between said bus interface unit and said cache, and wherein said invalidation signaling logic means includes means operative upon detection by said bus snooping logic that data is being written by said one expansion memory device controlling said I/O bus to said cacheable memory location in said another expansion memory device, to determine when said system bus is free to receive said invalidation signal, and effective, while said system bus is not free to receive said invalidation signal, to cause said address register to retain an address currently stored in said address register until the system bus becomes free to receive said invalidation signal.

14. The computer system as defined in claim 13 wherein said I/O bus permits said one expansion memory device controlling said I/O bus to retain control of said I/O bus continuously, while writing data conservatively to different first and second cacheable memory locations in said another expansion memory device; and wherein said invalidation signaling logic is effective when said system bus is not free as data is written to said first cacheable memory location and while data is being written to said second cacheable memory location to cause said register to retain the address of said first cacheable memory location and prevent entry into said register of the address of said second cacheable memory location until said system bus becomes free to receive an invalidation signal containing said address of said first cacheable memory location.

15. The computer system as defined in claim 14 wherein said invalidation logic includes an additional address register serving as a back-up buffer relative to said address register, said additional address register being used to store the address of said second cacheable memory location, when data is written successfully to said first and second cacheable memory locations, and the writing of data to said second cacheable memory location is detected before an invalidation signal can be sent on said system bus relative to said first cacheable location, said additional register serving to store said address of said second cacheable memory location until said invalidation signal can be sent relative to said first cacheable memory location.

* * * * *

UNITED STATES PATENT AND TRADEMARK OFFICE
CERTIFICATE OF CORRECTION

PATENT NO. : 5,966,728
DATED : October 12, 1999
INVENTOR(S) : Nader Amini et al.

It is certified that error appears in the above-identified patent and that said Letters Patent is hereby corrected as shown below:

Title page,
Item [54], Title, after "SNOOPING" change "DATE" to -- DATA --.
Item [57], ABSTRACT,
Line 1, after "method" insert -- are provided to --.
Line 3, after "an" delete "input/output (I/O)" and insert -- I/O --.

Column 12,
Line 56, after "available" insert -- and wherein said means for writing is in circuit communication with said means for identifying and said data invalid/snoop logic --.

Column 13,
Line 22, after "bus" delete the parenthesis ")" and insert a semicolon -- ; --.
Line 42, before "register" insert -- address --.
Line 47, after "said" insert -- address --.

Signed and Sealed this

Eighth Day of March, 2005

JON W. DUDAS
*Director of the United States Patent and Trademark Office*